No. 644,769. Patented Mar. 6, 1900.
C. L. JENNE.
BICYCLE.
(Application filed July 1, 1899.)
(No Model.)
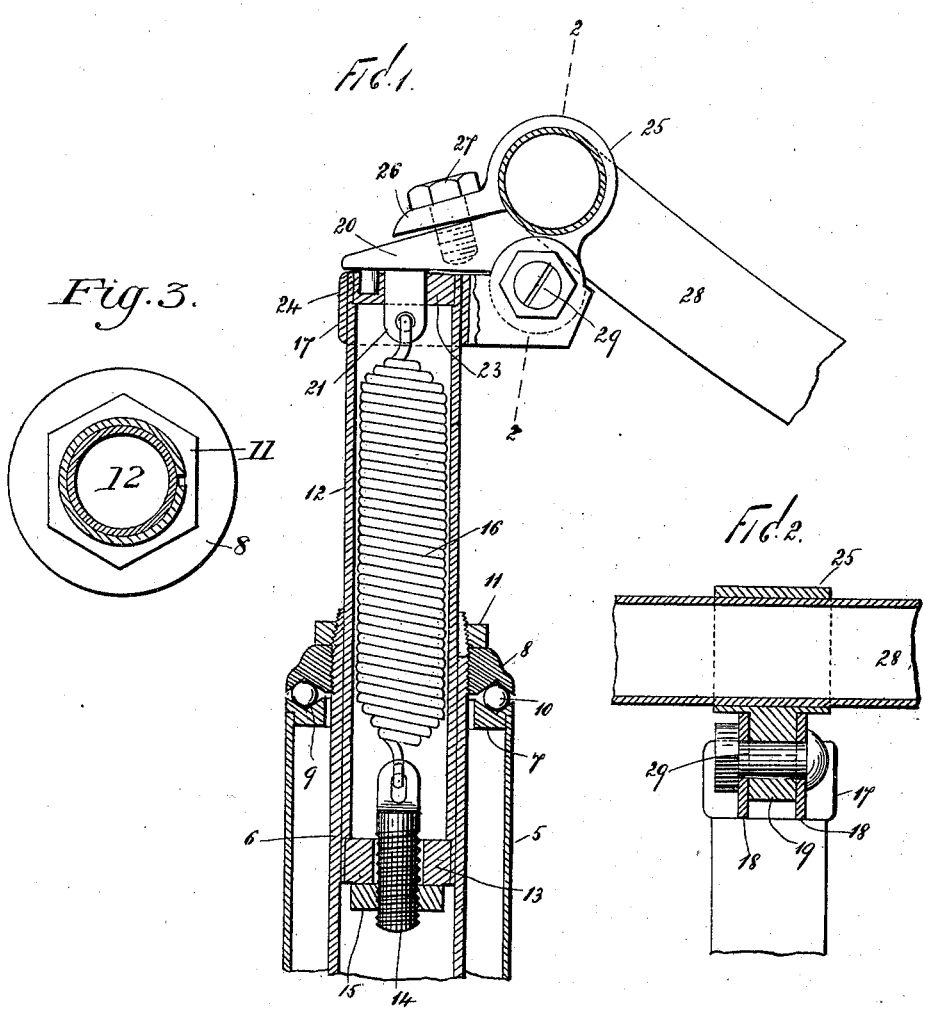
WITNESSES
John Buckler,
F. A. Stewart
INVENTOR
Charles L. Jenne,
BY
Edgar Tate & Co.
ATTORNEYS

UNITED STATES PATENT OFFICE.

CHARLES LYNDON JENNE, OF SPRINGFIELD, MASSACHUSETTS.

BICYCLE.

SPECIFICATION forming part of Letters Patent No. 644,769, dated March 6, 1900.

Application filed July 1, 1899. Serial No. 722,496. (No model.)

*To all whom it may concern:*

Be it known that I, CHARLES LYNDON JENNE, a citizen of the United States, residing at Springfield, in the county of Hampden and State of Massachusetts, have invented certain new and useful Improvements in Bicycles, of which the following is a full and complete specification, such as will enable those skilled in the art to which it appertains to make and use the same.

This invention relates to the handle-bars of bicycles and similar vehicles and means for supporting the same; and the object thereof is to provide improved devices of this class whereby the ends of the handle-bar will be yieldingly supported and the jolt or jar to the arms and shoulders occasioned by the vehicle passing over rough roads obviated.

The invention is fully disclosed in the following specification, of which the accompanying drawings form a part, in which—

Figure 1 is a sectional side elevation of the tubular head of the frame of a bicycle or similar vehicle and showing the means which I employ for supporting the handle-bars, and Fig. 2 a section on the line 2 2 of Fig. 1.

In the drawings forming part of this specification the separate parts of my improvement are designated by the same numerals of reference in each of the views, and in said drawings I have shown at 5 the tubular head of the frame of a bicycle or similar vehicle through which the stem of the front fork passes and at 6 a part of said stem, and in the practice of my invention I secure in the upper end of the tubular head 5 an inner collar 7, and a corresponding outer collar 8 is secured onto the upper end of the stem 6, and between the collars 7 and 8 is a ball-race 9, in which are placed ball-bearings 10, and a set-nut 11 is screwed onto the upper end of the stem 6 above the collar 8, and the said upper end of the stem 6 is reduced in thickness, conical in form, and split at one side, and the nut 11 is conical and serves to clamp and hold the handle-bar post 12 in the stem 6.

The handle-bar post 6 is tubular in form, and the lower end thereof is closed by a screw-threaded plug 13, through which passes a screw-threaded bolt 14, on the lower end of which is a set-nut 15, and connected with the upper end of the bolt 14 is a strong spiral spring 16.

The upper end of the handle-bar post 12 is provided with a clamp or band 17, one side of which is provided with jaws 18, between which is pivoted a jaw 19, formed on a lever 20, which is preferably wedge-shaped in form, and the lever 20 is provided with a downwardly-directed finger 21, which passes through a plug 22, secured in the upper end of the handle-bar post 12, and the upper end of the spring 16 is connected with the finger 21, and said lever 20 is also provided near its front end with a lug or projection 24, which enters a corresponding recess in the plug 23. The rear end of the lever 20 is provided directly over its support with a clamping-band 25, preferably formed integrally therewith and which is provided with a head 26, and passed through said head 26 is a screw-threaded bolt 27, which enters a corresponding screw-threaded socket in the lever 20, and the clamping-band 25 serves as a means for holding the handle-bar 28 in place. By loosening the bolt 27 the ends of the handle-bars may be vertically adjusted, as will be readily understood, and said ends of the handle-bar may be secured at any desired adjustment by tightening the bolt 27.

When downward pressure is applied to the ends of the handle-bar, the lever 20 will turn slightly on its pivotal support at 29, and said lever is normally held in the position shown in Fig. 1 by the spring 16, and it will thus be seen that all pressure applied to the ends of the handle-bar is thrown upon the spring 16, which will yield within certain limits.

This construction avoids the jolt or jar occasioned by the vehicle passing over rough roads and at the same time does not interfere with the operation of the handle-bar or the guiding of the vehicle thereby and does not materially add to the cost thereof.

The tension of the spring 16 may be regulated by the bolt 14 and the nut 15 on the lower end of said bolt, and the ball-bearings 13 reduce the friction between the stem of the front fork and the tubular head of the frame of the vehicle.

Having fully described my invention, I claim as new and desire to secure by Letters Patent—

1. A handle-bar post for bicycles and similar vehicles which is tubular in form and the lower end of which is closed by a plug, a spring in said post and connected with the plug in the lower end thereof, a clamp or band secured to the upper end of said post, a lever pivoted to one side of said clamp or band and projecting over the end of said post and provided with a finger which passes downward into said post and is connected with said spring, said lever being also provided over its pivotal support with a clamp through which the handle-bar passes, substantially as shown.

2. A handle-bar post for bicycles and similar vehicles which is tubular in form and both ends of which are closed by plugs, a spring mounted in said post and adjustably connected with the plug in the lower end thereof, a clamp or band secured to the upper end of said post, a lever pivoted to one side of said clamp or band and projecting over the end of said post and provided with a finger which passes downwardly through the plug therein and is connected with said spring, said lever being also provided over its pivotal support with a clamp or band through which the handle-bar is passed, substantially as shown and described.

In testimony that I claim the foregoing as my invention I have signed my name, in presence of the subscribing witnesses, this 29th day of June, 1899.

CHARLES LYNDON JENNE.

Witnesses:
SCOTT ADAMS,
JONATHAN BARNES.